United States Patent
Tai et al.

(10) Patent No.: US 11,754,894 B2
(45) Date of Patent: Sep. 12, 2023

(54) DISPLAY DEVICE

(71) Applicant: Innolux Corporation, Miao-Li County (TW)

(72) Inventors: Ming-Jou Tai, Miao-Li County (TW); Chia-Hao Tsai, Miao-Li County (TW); Yu-Shih Tsou, Miao-Li County (TW)

(73) Assignee: Innolux Corporation, Miaoli County (TW)

( * ) Notice: Subject to any disclaimer, the term of this patent is extended or adjusted under 35 U.S.C. 154(b) by 0 days.

(21) Appl. No.: 17/884,590

(22) Filed: Aug. 10, 2022

(65) Prior Publication Data
US 2022/0382112 A1    Dec. 1, 2022

Related U.S. Application Data

(63) Continuation of application No. 17/182,186, filed on Feb. 22, 2021, now Pat. No. 11,448,930.

(30) Foreign Application Priority Data

Mar. 17, 2020   (CN) .......................... 202010185373.6

(51) Int. Cl.
*G02F 1/1362*   (2006.01)
*G02F 1/13357*  (2006.01)

(52) U.S. Cl.
CPC .. *G02F 1/136209* (2013.01); *G02F 1/133602* (2013.01); *G02F 1/136286* (2013.01)

(58) Field of Classification Search
CPC ..................................................... G02F 1/1362
See application file for complete search history.

(56) References Cited

U.S. PATENT DOCUMENTS

| | | | |
|---|---|---|---|
| 2017/0153482 A1* | 6/2017 | Miyamoto | G02F 1/1343 |
| 2017/0276990 A1* | 9/2017 | Chen | G02F 1/136286 |
| 2019/0162990 A1* | 5/2019 | Nishimura | G02F 1/167 |

\* cited by examiner

*Primary Examiner* — Sang V Nguyen
(74) *Attorney, Agent, or Firm* — JCIPRNET

(57) ABSTRACT

The disclosure provides a display device including a substrate, two adjacent scan lines, two adjacent data lines and an opening. Two adjacent scan lines extending along a first direction. Two adjacent scan lines and two disposed adjacent data lines are disposed on the substrate. The pixel is defined by the two adjacent scan lines and the two adjacent data lines. The opening is corresponding to the pixel, and an edge of the opening is adjacent to an edge of one of the two adjacent scan lines. A distance between the edge of the opening and the edge of the one of the two adjacent scan lines is from 1 micrometer to 2 micrometers, and the distance is along a second direction perpendicular to the first direction. The display device of the disclosed embodiment may improve the contrast ration of the display device.

15 Claims, 5 Drawing Sheets

DISPLAY DEVICE

CROSS-REFERENCE TO RELATED APPLICATION

This application is a continuation of and claims the benefit of a prior U.S. application Ser. No. 17/182,186, filed Feb. 22, 2021, now allowed. The prior U.S. application claims the priority benefit of China application serial no. 202010185373.6, filed on Mar. 17, 2020. The entirety of each of the above-mentioned patent applications is hereby incorporated by reference herein and made a part of this specification.

BACKGROUND

Technical Field

The present disclosure relates to a display device.

Description of Related Art

As the application of display devices continues to expand, the development of display technology is also changing rapidly. Different problems to be solved may be faced with various application conditions of display devices. Therefore, the research and development of display devices must be continuously updated and adjusted.

SUMMARY

The present disclosure is to provide a display device with a lower aperture ratio sacrifice or better display quality.

According to an embodiment of the present disclosure, a display device includes a back light module, a pixel, a light shielding element and an opening. The back light module can emit lights while turned on. The pixel is disposed on the back light module and allows the lights from the back light module to pass through. The opening is disposed corresponding to the pixel and the light emitted from the back light module may pass through the pixel and the opening. The pixel has a dark region when the back light module is turned on and the light shielding element shields at least a portion of the dark region.

According to an embodiment of the present disclosure, a display device includes a substrate, two adjacent scan lines, two adjacent data lines and an opening. Two adjacent scan lines extending along a first direction. Two adjacent scan lines and two disposed adjacent data lines are disposed on the substrate. The pixel is defined by the two adjacent scan lines and the two adjacent data lines. The opening is corresponding to the pixel, and an edge of the opening is adjacent to an edge of one of the two adjacent scan lines. A distance between the edge of the opening and the edge of the one of the two adjacent scan lines is from 1 micrometer to 2 micrometers, and the distance is along a second direction perpendicular to the first direction. The display device of the disclosed embodiment may improve the contrast ration of the display device.

In order to make the above-mentioned features and advantages of the present disclosure more obvious and understandable, the embodiments are specifically described below in conjunction with the drawings for detailed description as follows.

BRIEF DESCRIPTION OF THE DRAWINGS

Drawings are included for further understanding of this disclosure, and the drawings are incorporated into and constitute a part of this specification.

The drawings illustrate the embodiments of the present disclosure and together with the description are used to explain the principles of the present disclosure.

DESCRIPTION OF THE EMBODIMENTS

Figure 1:
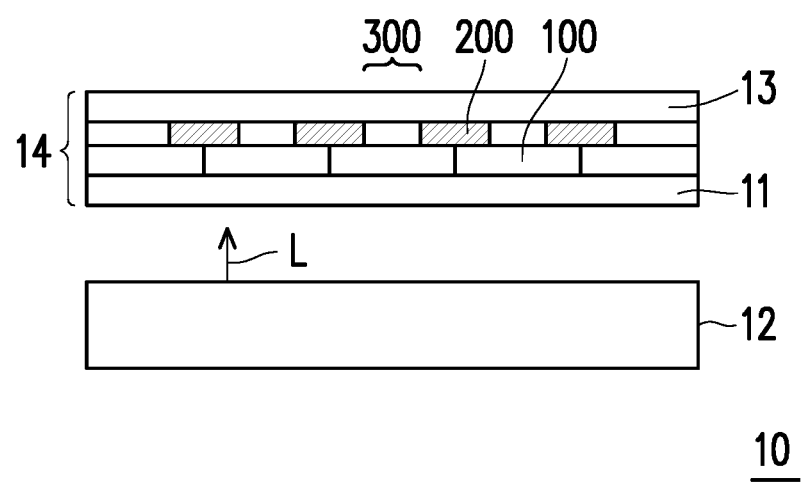
FIG. 1 is a schematic diagram showing a display device according to an embodiment.

Reference will now be made in detail to the exemplary embodiments of the present disclosure, examples of which are illustrated in the drawings. Wherever possible, the same component symbols are used in the drawings and description to denote the same or similar parts.

In this disclosure, the description that a structure (or layer, component, substrate) described is located on/above another structure (or layer, component, substrate) may refer to the two structures being adjacent and directly connected, or may refers to the two structures adjacent to each other rather than directly connected (indirect connection). Indirect connection means that there is at least one intermediate structure (or intermediate layer, intermediate component, intermediate substrate, intermediate space) between the two structures, and a lower/bottom surface of one structure is adjacent to or directly connected to an upper/top surface of the intermediate structure, and an upper/top surface of another structure is adjacent to or directly connected to a lower/bottom surface of the intermediate structure, and the intermediate structure can be a solid structure constructed of a single layer or multiple layers or a non-solid structure, which forms no limitation to the disclosure. In this disclosure, when a structure is arranged "on" another structure, it may mean that the structure is "directly" on the other structure, or that the structure is "indirectly" on the other structure, that is, between said structure and the other structures there is at least one structure.

The electrical connection or coupling described in this disclosure may refer to direct connection or indirect connection. In the case of direct connection, the endpoints of the components on the two circuits are directly connected or connected to each other by a conductor line segment, while in the case of indirectly connected, there are switches, diodes, capacitors, inductors, resistors, other suitable components, or a combination of the above components between the endpoints of the components on the two circuits, but the intermediate component is not limited thereto.

In the present disclosure, the thickness, length and width can be measured by using an optical microscope, and the thickness can be measured by a cross-sectional image in an electron microscope, but the disclosure is not limited thereto. In addition, any two values or directions used for comparison may have certain errors. If the first value is equal to the second value, it implies that there may be an error of about 10% between the first value and the second value.

FIG. 1 is a schematic diagram of a display device according to an embodiment of the disclosure. In FIG. 1, a display device 10 includes a back light module 12 and a display panel 14. The back light module 12 emits lights L while turned on, and the lights L emitted from the back light module 12 travels toward the display panel 14. The display panel 14 includes a plurality of pixels 100, and each pixel 100 is disposed on the back light module 12 and allows the lights L emitted from the back light module 12 to pass through. Generally, the display panel 14 includes two substrates 11 and 13 facing each other, and the pixel 100 is disposed between the substrate 11 and the substrate 13. For example, different pixels 100 may provide different degrees of transmittance of the lights L, and various gray levels of the brightness in different pixels are presented to display an image. In some embodiments, the pixel 100 may include a display medium (not shown), and the display medium is driven by a driving member (not shown). The substrate 11 and the substrate 13 may be hard substrates or flexible substrates. The material of a hard substrate may include glass, quartz or other suitable materials, or a combination of the above materials; the material of a flexible substrate may include polyimide (PI), polyethylene terephthalate (PET), or a single layer or stack of one of other applicable materials, or a stack or mixture of at least two of the above materials, but the disclosure is not limited thereto. The display medium may include photoelectric materials, such as liquid crystal materials, electrophoretic materials, etc., and the driving member may be electrically connected to a driving signal source to provide a driving electric field that can drive the display medium. In addition, the display panel 14 further includes a light shielding element 200 and a plurality of openings 300. The openings 300 are defined by the light shielding element 200, for example. The openings 300 are provided to correspond to the pixels 100 and lights L emitted from the back light module 12 passes through the pixel 100 and the opening 300.

Figure 2A:
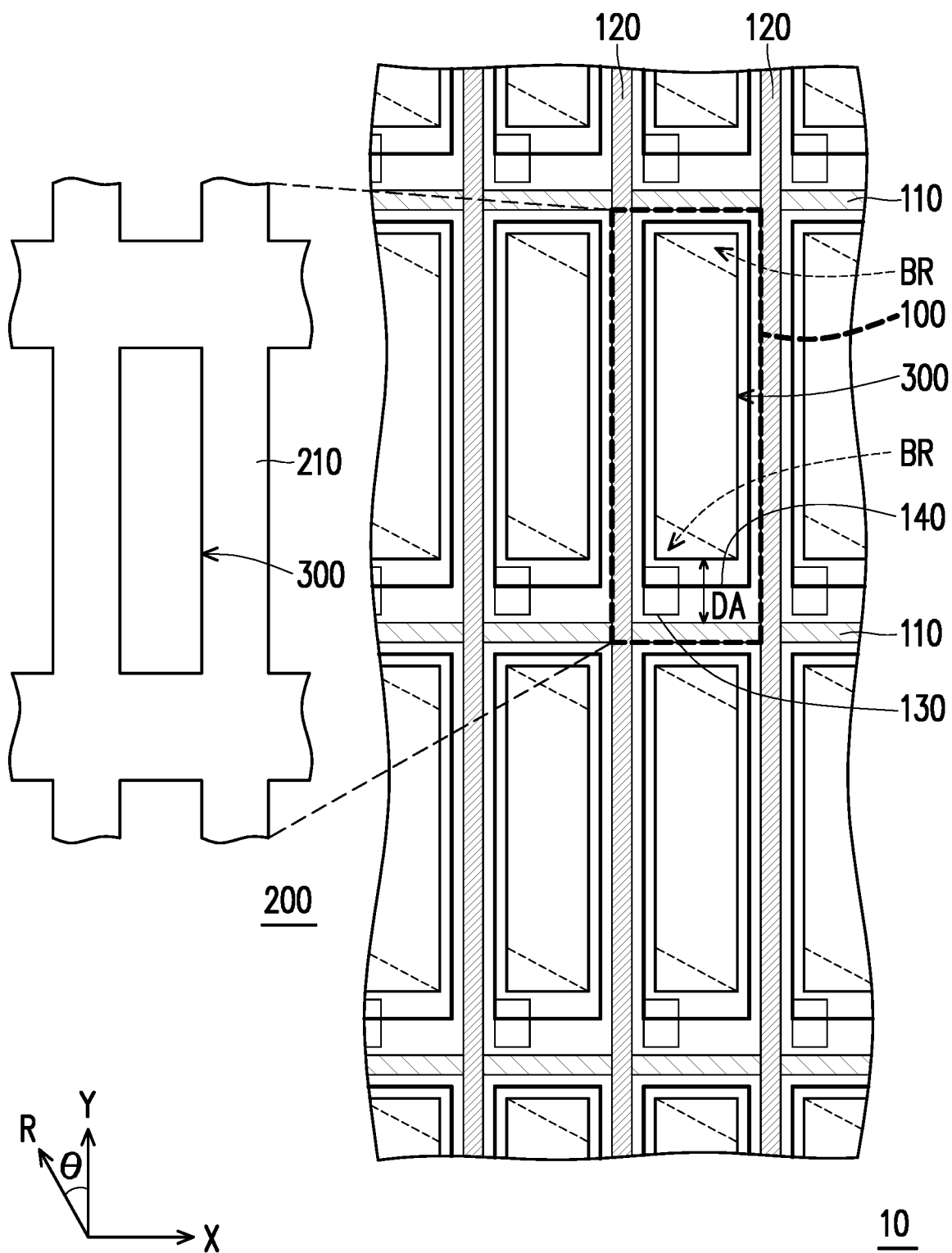
FIG. 2A is a partial schematic top view of a display device according to an embodiment of the disclosure.
Figure 2B:
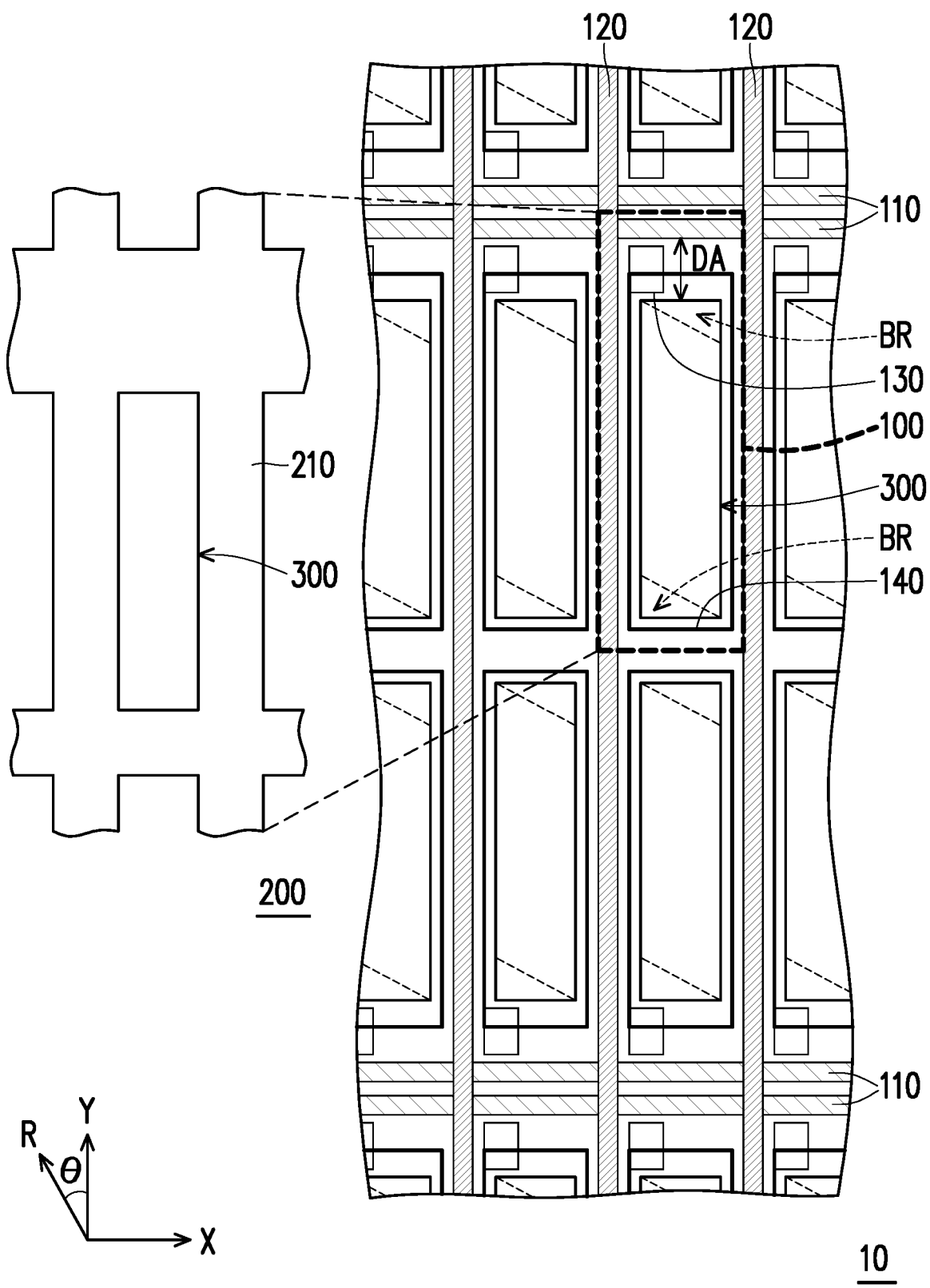
FIG. 2B is a partial schematic top view of a display device according to an embodiment of the disclosure.

FIG. 2A is a partial schematic top view of a display device according to an embodiment of the disclosure. The structure presented in FIG. 2A may be one embodiment of the display device 10 of FIG. 1. In the embodiment, the display device 10 includes a plurality of pixels 100 arranged in a matrix, and adjacent pixels 100 in the same column direction (along the extension direction of a data line 120, that is, the Y direction) may have the same layout design, but the disclosure is not limited thereto. In the embodiment, among the pixels 100 arranged in matrix, the adjacent pixels 100 in the same row direction (along the extension direction of a scan line 110, that is, the X direction) may have the same layout design, but the disclosure is not limited thereto. Each pixel 100 may be defined by adjacent scan lines 110 and adjacent data lines 120. In an embodiment, each pixel 100 may be defined by one side of a data line 120 to the same side of the next data line 120 and one side of a scan line 110 to the same side of the next scan line 110. For example, the pixel 100 can be defined from the left side of the data line 120 to the left side of the next data line 120, and from the bottom side of the scan line 110 to the bottom side of the next scan line 110, but the disclosure is not limited thereto. FIG. 2B is a partial schematic top view of a display device according to another embodiment of the disclosure. The structure presented in FIG. 2B may be another embodiment of the display device 10 of FIG. 1. In the embodiment, the display device 10 includes a plurality of pixels 100 arranged in a matrix, and layouts of adjacent pixels 100 in the same column direction (along the extension direction of the data line 120, that is, the Y direction) may be mirrored symmetric, but the disclosure is not limited thereto. In the embodiment, the adjacent pixels 100 of multiple pixels 100 in the same row direction (along the extension direction of the scan line 110, that is, the X direction) have the same layout design, but the disclosure is not limited thereto. In the embodiment, the scan lines may be paired. Each pixel 100 may be defined by adjacent pairs of the scan lines 110 and adjacent data lines 120. In the embodiment, each pixel 100 may be defined by one side of a data line 120 to the same side of the next data line 120, and from a midline of the two scan lines 110 in one scan line pair to a half of the distance from the midline of the two scan lines 110 in said one scan line pair to a midline of the two scan lines 110 in a next scan line pair. For example, the pixel 100 can be defined by the left side of one data line 120 to the left side of the next data line 120, and a midline of the two scan lines 110 in one scan line pair to a half of the distance from the midline of the two scan lines 110 in said one scan line pair to a midline of the two scan lines 110 in a next scan line pair, but the disclosure is not limited thereto.

Please refer to FIG. 1, FIG. 2A and FIG. 2B at the same time. In the cross-section and top view of the display device 10, the pixel 100 may further include a display medium (not shown) disposed between the substrate 11 and the substrate 13. The scan line 110, the data line 120, switch components 130, pixel electrodes 140, or a common electrode (not shown) may be located between the display medium and one of the substrates 11 and 13 to form a driving member and may provide an electric field to drive the display medium. These pixels 100 can be disposed above the back light module 12 and allow the light L emitted by the back light module 12 to pass through to achieve the display effect.

The extension direction of the scan line 110 is different from the extension direction of the data line 120. In one embodiment, the extension direction (X direction) of the scan line 110 and the extension direction (Y direction) of the data line 120 may be substantially perpendicular, but the disclosure is not limited thereto. The scan line 110 and the data line 120 can be disposed in different layers. According to the consideration of the conductivity, the scan line 110 and the data line 120 are generally made of metal materials, such as aluminum, molybdenum, copper, titanium or similar materials or a combination of the foregoing, but the disclosure is not limited thereto. In other embodiments, other conductive materials such as (but not limited to) alloys or stacked layers with the aforementioned metal materials may also be used for forming the scan line 110 and the data line 120.

The pixel electrode 140 is electrically connected to the switch component 130 and provides an electric field to drive the display medium. In an embodiment, the pixel electrode 140 and the common electrode may be disposed on the substrate 11 and the substrate 13, respectively. In another embodiment, the pixel electrode 140 and the common electrode may be disposed on the same substrate, for example, on the substrate 11, and the pixel electrode 140 may be a film layer under the common electrode, but the disclosure is not limited thereto.

The display device 10 further includes a light shielding element 200 and an opening 300 defined by the light shielding element 200 in addition to the pixel 100, and the light shielding element 200 is disposed between the substrate 11 and the substrate 13. In some embodiments, as shown in the enlarged view of the light shielding element 200, the light shielding element 200 includes a frame 210 and is disposed on the substrate 13 and above the pixel 100, but the disclosure is not limited thereto. In some embodiments, the light shielding element 200 is disposed on the substrate 11 and under the pixel 100, but the disclosure is not limited thereto. When a user views an image displayed by the display device 10, the light shielding element 200 may be located between the pixel 100 and the user. In the embodiment, the light shielding element 200 may be patterned to define an opening 300, wherein the opening 300 may be disposed within the range of the pixel electrode 140. In this way, the periphery of the pixel electrode 140, the scan line 110, the data line 120, the switching element 130, etc. may be substantially shielded by the light shielding element 200, and only the area of the opening 300 allows light to pass through.

The opening 300 defined by the light shielding element 200 determines the amount of light L that the display device 10 can pass, that is, the area of the display aperture. The larger area of the opening 300, the larger area of the display aperture of the display device 10, but may also increase the possibility that areas with poor display effects may be exposed. The areas with poor display effects may include the area where the switch component 130 is located and/or where scan line 110 or data line 120 is located. For example, when the pixel 100 displays a bright state image, the area where the switch component 130 is exposed in the opening 300 may reduce the amount of light L passing through and a dark region may be formed. Therefore, the area where the switch component 130 is located in the pixel 100 may lower the brightness of the bright state image, and the pixel 100 may not present a preset brightness (luminance of bright state), which reduces the display effect of the display device 10, for example, the contrast ratio decreases. Here, the contrast ratio can be understood as the ratio of the brightness of the bright state image to the brightness of the dark state image. When the resolution of the pixel 100 is higher, the size of each pixel 100 will become smaller, and the proportion of the area with poor display effect in the entire pixel 100 will increase accordingly, and the effect of reducing the display effect will be more obvious. The light shielding element 200 may shield the dark region that reduces the display effect, and/or improve the display effect of the display device 10, for example, to increase the contrast ratio.

In one embodiment, the light shielding element 200 may cover the scan line 110 and extends toward the pixel electrode 140. At this time, the edge of the opening 300 is separated from the corresponding scan line 110 by a distance DA, where the distance DA is, for example, 1 micrometer (μm) to 2 micrometer, but the disclosure is not limited thereto and the distance can be adjusted according to design needs. In this way, the light shielding element 200 may cover at least a part of the switch component 130, and reduce the dark region where poor display effect occurs. Although the design of narrowing the opening 300 may slightly reduces the area of the display aperture, the dark regions where poor display effect occurs may be shielded, which may improve the display effect of the display device 10, such as increasing the contrast ratio. In this way, the display device 10 may be applied to a high-resolution display, and may increase the contrast ratio and/or improve the display effect on the premise of slightly reducing the brightness of the display (luminance of bright state). For example, the display device 10 may have a resolution of more than 1,000 pixels per inch (PPI).

In an embodiment, when the display medium in the display device 10 is a liquid crystal material, a liquid crystal alignment process may be needed to improve the effect of the liquid crystal material being driven. For example, when an alignment directions R and Y direction are intersected at an angle θ in the counterclockwise direction, the liquid crystal materials is not controlled by the electric field, the liquid crystal materials will be aligned along the alignment direction R. When the liquid crystal material is controlled by the electric field, the liquid crystal materials will be aligned with the direction of the electric field. At this time, the polarization state of the light L may be adjusted when passing through the liquid crystal material, and then the adjusted light may pass through a polarizer (not shown) to present a required brightness. For example, when the light L in a portion of the pixel 100 passes through the liquid crystal material to adjust its polarization state, if the polarization direction of the adjusted light is substantially parallel to the absorption axis of the polarizer, the light L will be mostly absorbed by the polarizer, causing the brightness (luminance of bright state) in the area reduced, so that dark areas of visual effect will be presented, such as the dark region BR in FIGS. 2A and 2B. This is also an area that causes poor display effect. Therefore, the light shielding element 200 may shield the dark region that reduces the display effect to improve the display effect of the display device 10. In an example as shown in FIG. 2A, when the light shielding element 200 increases the range of shading, the area ratio of the opening 300 relative to the pixel 100 may be within a range of not less than 0.04 and not more than 0.06, but the disclosure is not limited thereto. In an example as shown in FIG. 2B, when the light shielding element 200 increases the range of shading, the area ratio of the opening 300 relative to the pixel 100 may be within a range of not less than 0.11 and not more than 0.19, but the disclosure is not limited thereto.

Figure 3:
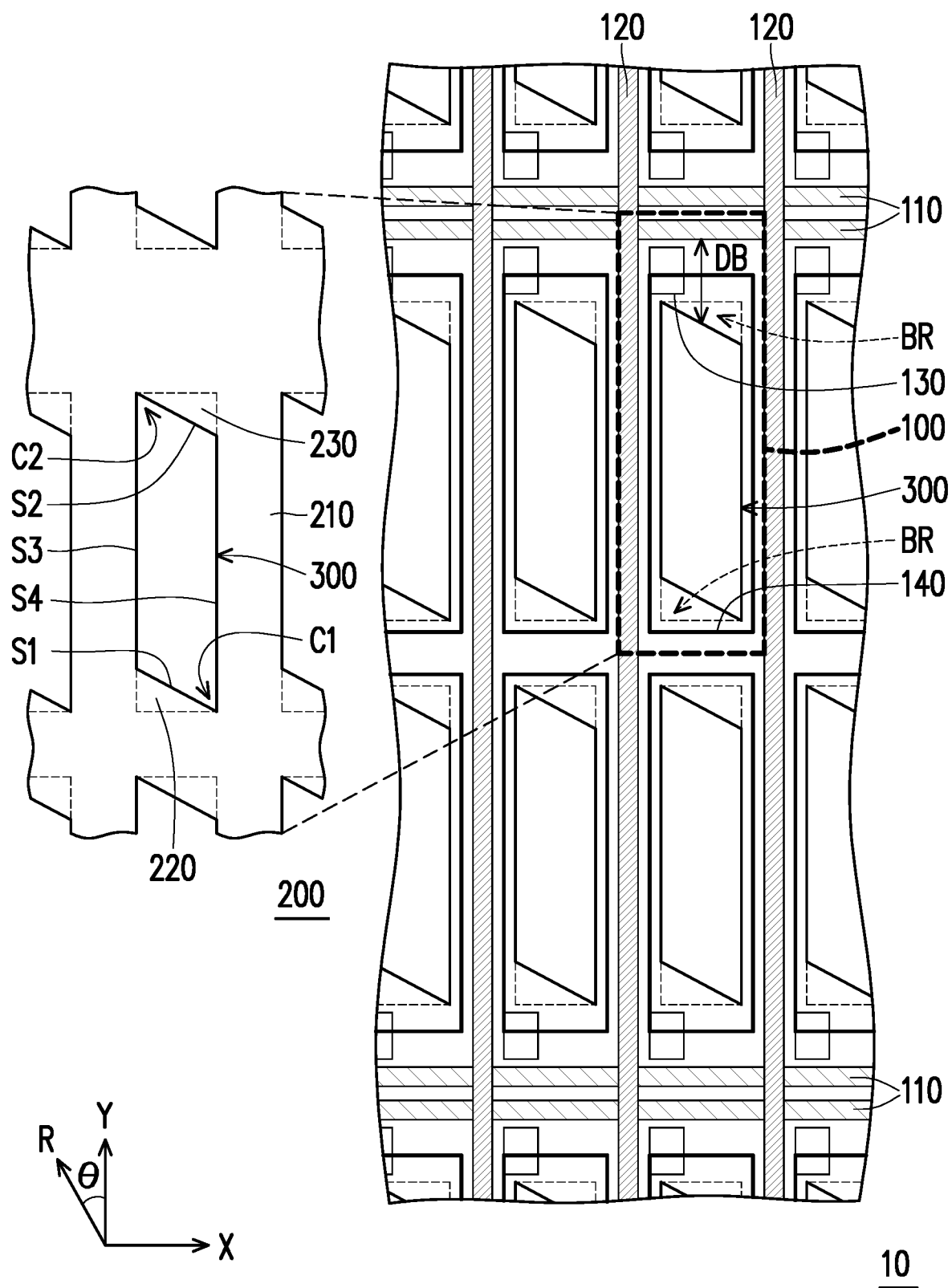
FIG. 3 is a partial schematic top view of a display device according to an embodiment of the disclosure.

FIG. 3 is a partial schematic top view of a display device according to an embodiment of the disclosure. The structure presented in FIG. 3 may be one embodiment of the display device 10 of FIG. 1. In FIG. 3, the structure of the embodiment is substantially the same as FIG. 2B, the difference lies in the design of the light shielding element 200, so the specific structure of the display device 10 can refer to the description of the foregoing embodiment, and will not be repeated here. Similar to the foregoing embodiment, the light shielding element 200 may include a frame 210, and the specific shape and layout of the frame 210 may refer to the description of the foregoing embodiment, and will not be repeated here.

When the display medium in the display device 10 is a liquid crystal material, as described above, some areas in the pixel 100 will visually appear as dark regions, such as the dark region BR in FIG. 2B. The light shielding element 200 may be designed to shield the area around the dark region BR. In the embodiment, as shown in a partially enlarged view of the light shielding element 200 in FIG. 3, the light shielding element 200 includes the frame 210 and a first protrusion 220. The frame 210 is substantially arranged along with the contour of the pixel 100, for example. The frame 210 of the light shielding element 200 may be substantially a light shielding pattern parallel to the scan line 110 and the data line 120, and the first protrusion 220 protrudes from the frame 210 and may be disposed corresponding to the dark region BR. For example, the first protrusion 220 may shield at least a portion of the dark region BR, or may completely cover the dark region BR. In addition, the light shielding element 200 may further include a second protrusion 230, and the first protrusion 220 and the second protrusion 230 are disposed at diagonal corners of the frame 210 to shield the corresponding dark regions BR.

In the embodiment, the first protrusion 220 may have a triangle-like contour or a quadrilateral-like contour. FIG. 3 illustrates the first protrusion 220 with a triangle-like contour as an example, but the disclosure is not limited thereto. The second protrusion 230 may have a triangle-like contour or a quadrilateral-like contour, and the second protrusion 230 may have the same pattern as the first protrusion 220, but the disclosure is not limited thereto. In other embodiments, the contours of the first protrusion 220 and the second protrusion 230 may have different patterns. For example, one of the first protrusion 220 and the second protrusion 230 may have a triangle-like contour and the other has a quadrilateral-like contour. In other embodiments, the contours of the first protrusion 220 and the second protrusion 230 may be irregular polygons, arcs, or sectors, etc.

The opening 300 defined by the light shielding element 200 is a closed pattern surrounded by a first side S1, a second side S2, a third side S3 and a fourth side S4. The first side S1 and the second side S2 are, for example, defined by the first protrusion 220 and the second protrusion 230, respectively, and the third side S3 and the fourth side S4 are arranged parallel to the extending direction (Y direction) of the data line 120. Here, a distance DB between the opening 300 and the corresponding scan line 110 may gradually increase from the third side S3 to the fourth side S4 along the extending direction (X direction) of the scan line 110. The opening 300 may be roughly a parallelogram pattern, but the disclosure is not limited thereto. The first side S1 and the fourth side S4 of the opening 300 intersect to form a first acute corner C1. In this way, the first protrusion 220 of the light shielding element 200 may shield at least a portion of the dark region BR, or may shield the entire of the dark region BR. In addition, the second side S2 and the third side S3 of the opening 300 intersect to form a second acute corner C2. At this time, although the area where the pixel 100 can display is partially shielded by the light shielding element 200, the shielded portion is a visually dark region BR or an area with poor display effect when the back light module (such as the back light module 12 of FIG. 1) is turned on, which may increase the contrast ratio of the display device 10.

If the area of the opening 300 is increased, or if the first protrusion 220 is removed, for example, the dark region BR will be exposed in the opening 300, the brightness of the display device 10 when displaying the bright state image will be lower than the expected brightness (luminance of bright state) and the contrast ratio is reduced. In contrast, when the opening 300 has the design as shown in FIG. 3, the dark region BR may be shielded by the light shielding element 200 and will not be exposed by the opening 300. The brightness of the bright state image displayed by the display device 10 may be reduced by a smaller extent or least extent, and the contrast ratio may be improved. Overall, although the design of the opening 300 allows the area where the pixel 100 originally allows the penetrating of the light to be partially shielded by the light shielding element 200 to reduce the overall brightness (luminance of bright state), but the dark region BR may be shielded, and the contrast ratio of the display device 10 may be improved.

The design of the display device 10 can be applied to high-resolution display devices or related products. In this type of products, the size of the pixel 100 is small and the density of the distribution is high, and the screen door effect generated in the enlarged image is not obvious. In addition, the high-resolution design can achieve a large field of view (FOV) and present a more stereoscopic and/or realistic visual effect. And, the display device 10 is suitable for applications of virtual reality or augmented reality effects. Due to the small size of the pixel 100 and high resolution of the display device 10, the disconnection lines caused by the unevenness of the display medium, such as the dark region BR, will have an obvious effect on the contrast ratio of the display device 10. Adjusting the design of the light shielding element 200 in the display device 10 to change the size of the opening 300 to substantially shield the dark region BR may improve the display effect of the display device 10.

Figure 4:
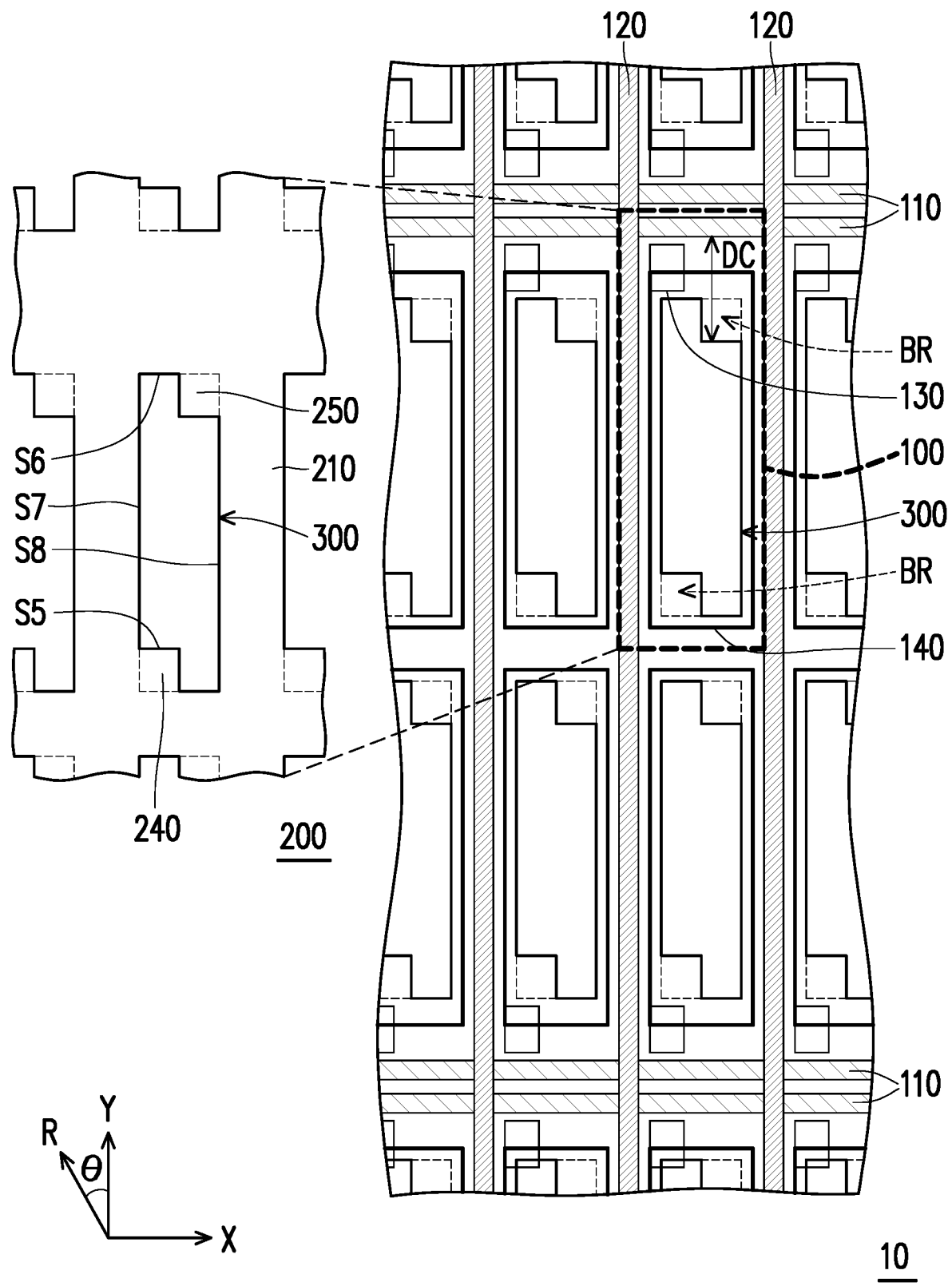
FIG. 4 is a partial schematic top view of a display device according to an embodiment of the disclosure.

FIG. 4 is a partial schematic top view of a display device according to an embodiment of the disclosure. The structure presented in FIG. 4 may be one embodiment of the display device 10 of FIG. 1. In FIG. 4, the structure of the embodiment is substantially the same as FIG. 2B, the difference between the two embodiments lies in the design of the light shielding element 200, so the specific structure of the other components and elements in the display device 10 can refer to the description of the foregoing embodiment, and will not be repeated here. Similar to the foregoing embodiment, the light shielding element 200 may include a frame 210, and the specific shape and layout of the frame 210 may refer to the description of the foregoing embodiment, and will not be repeated here.

When the back light module (such as the back light module 12 of FIG. 1) for the pixel 100 is turned on, some areas will visually appear as dark areas, such as the dark region BR in FIG. 2B, and the light shielding element 200 may shield at least a portion of the dark region BR. In other words, the pattern of the light shielding element 200 can be designed to increase the overlapping area of the light shielding element 200 and the dark region BR, and the area of the light shielding element 200 shields at least a portion of the dark region BR, or the entire of the dark region BR.

The dark region BR of the display device 10 roughly locates near the corner of the pixel electrode 140. In the embodiment, as shown in a partially enlarged view of the light shielding element 200 in FIG. 4, the light shielding element 200 includes the frame 210 and a first protrusion 240. The frame 210 may be substantially formed by a light shielding pattern parallel to the scan line 110 and the data line 120, and the first protrusion 240 is protruded from the frame 210. The design of the first protrusion 240 may shield the dark region BR in the display device 10. In addition, the light shielding element 200 may further include a second protrusion 250, and the first protrusion 240 and the second protrusion 250 are disposed at diagonal corners of the frame 210. In the embodiment, the first protrusion 240 has a quadrilateral-like contour, and the second protrusion 250 may have the same pattern as the first protrusion 240, but the disclosure is not limited thereto. In other embodiments, the contours of the first protrusion 240 and the second protrusion 250 may be different. For example, one of the first protrusion 240 and the second protrusion 250 may have a triangle-like contour and the other has a quadrilateral-like contour.

The first protrusion 240 and the second protrusion 250 may respectively shield at least a portion of the corresponding dark region BR, or even completely shield the dark region BR. In some embodiments, the contours of the first protrusion 240 and the second protrusion 250 may have a point-symmetric relationship, but may also be asymmetric with each other. In another embodiment, the contour and area of the first protrusion 240 may be disposed corresponding to the distribution area of the dark region BR, and the second protrusion 250 may disposed corresponding to any one or more of the switch component 130, the scan line 110 and the data line 120.

In the embodiment, the opening 300 defined by the light shielding element 200 is, for example, a closed pattern formed by a bended first side S5, a bended second side S6, a straight third side S7, and a straight fourth side S8. The first side S5 is connected between a bottom end point of the third side S7, and a bottom end point of the fourth side S8. The second side S6 is connected between an upper end point of the third side S7, and an upper end point of the fourth side S8. The distance DC between the opening 300 and the corresponding scan line 110 may be increased from the third side S7 to the fourth side S8 along the extending direction of the scan line 110.

In summary, in the display device of the disclosed embodiment, the opening is defined by the light shielding element, and the pattern design of the opening corresponds to the dark region of the display device, and the light shielding element may shield at least a portion of the dark region, or even all the portion of the dark region. In this way, the contrast ratio of the display device may be improved, and/or provide better display quality.

Lastly, it shall be noted that the foregoing embodiments are meant to describe, rather than limit, the technical solutions of the disclosure. Although the foregoing embodiments have been provided to detail the disclosure, persons ordinarily skilled in the art shall be aware that they may still make modifications to the technical solutions recited in the foregoing embodiments or make equivalent replacements of part or all of the technical features therein, and these modifications or replacements do not cause the nature of the corresponding technical solutions to depart from the scope of the technical solutions of the embodiments of the disclosure.

It should be noted that the technical features in different embodiments described in the following may be replaced, recombined, or mixed with one another to constitute another embodiment without departing from the spirit of the present disclosure.

What is claimed is:

1. A display device, comprising:
   a substrate;
   two adjacent scan lines disposed on the substrate and extending along a first direction;
   two adjacent data lines disposed on the substrate, wherein a pixel is defined by the two adjacent scan lines and the two adjacent data lines; and
   an opening corresponding to the pixel, wherein an edge of the opening is adjacent to an edge of one of the two adjacent scan lines;
   wherein a distance between the edge of the opening and the edge of the one of the two adjacent scan lines is from 1 micrometer to 2 micrometers, and the distance is along a second direction perpendicular to the first direction,
   wherein the opening comprises a first arc portion and a second arc portion, and the first arc portion and the second arc portion are disposed at diagonal corners of the opening.

2. The display device according to claim 1, further comprising a light shielding layer disposed on the substrate, wherein the light shielding layer comprises at least one protrusion corresponding to at least one of the first arc portion and the second arc portion.

3. The display device according to claim 1, further comprising a light shielding layer, wherein the light shielding layer is disposed on the pixel.

4. The display device according to claim 1, further comprising a light shielding layer and a switch component, wherein the switch component is disposed on the substrate and is overlapped with the light shielding layer.

5. The display device according to claim 4, wherein the light shielding layer comprises an arc edge.

6. The display device according to claim 1, further comprising a light shielding layer, wherein the light shielding layer shields the two adjacent scan lines and the two adjacent data lines.

7. The display device according to claim 1, wherein the pixel is defined by one side of one of the two adjacent data lines to a same side of the other of the two adjacent data lines and is defined by one side of one of the two adjacent scan lines to a same side of the other of the two adjacent scan lines.

8. The display device according to claim 7, further comprising a back light module and a light shielding layer, wherein the pixel is disposed between the light shielding layer and the back light module.

9. The display device according to claim 1, wherein the opening comprises a first side, a second side, a third side and a fourth side, the first side and the second side are connected between the third side and the fourth side, and the third side and the fourth side are parallel to the two adjacent data lines.

10. The display device according to claim 9, wherein the first side and the second side are bended.

11. The display device according to claim 1, wherein the distance is gradually increased along the first direction.

12. The display device according to claim 1, further comprising a pixel electrode, wherein the opening is located within the pixel electrode.

13. The display device according to claim 1, wherein the opening determines an area of a display aperture of the display device.

14. The display device according to claim 1, further comprising another substrate, and the pixel is disposed between the substrate and the another substrate.

15. The display device according to claim 14, wherein the pixel comprises a display medium.

* * * * *